(No Model.)
C. H. CLARK.
VALVE.
No. 574,392. Patented Jan. 5, 1897.
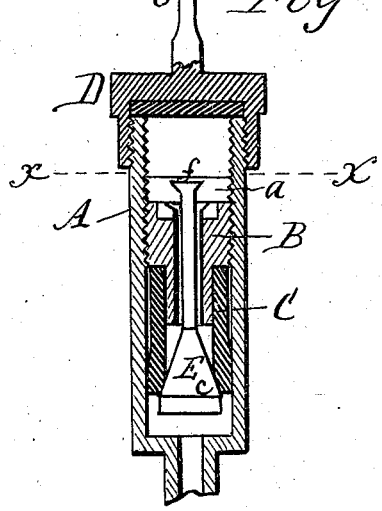
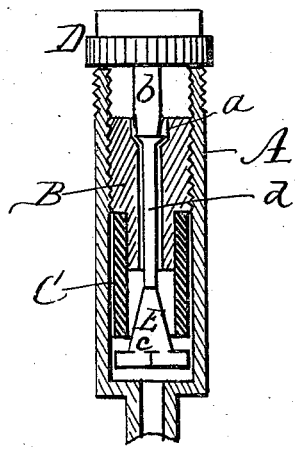
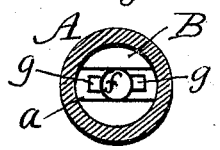
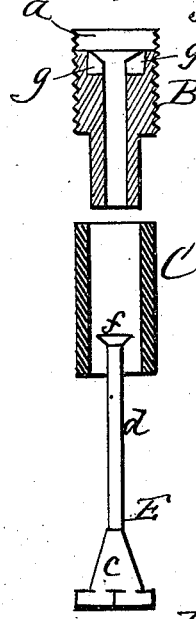
Witnesses.
C. R. Osgood
P. J. Nagle
Inventor.
Chas. H. Clark
per R. F. Osgood
Atty

UNITED STATES PATENT OFFICE.

CHARLES H. CLARK, OF ROCHESTER, NEW YORK.

VALVE.

SPECIFICATION forming part of Letters Patent No. 574,392, dated January 5, 1897.

Application filed September 10, 1896. Serial No. 605,367. (No model.)

*To all whom it may concern:*

Be it known that I, CHARLES H. CLARK, of Rochester, in the county of Monroe and State of New York, have invented a certain new and useful Improvement in Valves; and I do hereby declare that the following is a full, clear, and exact description of the same, reference being had to the drawings accompanying this application.

My invention relates to air-valves for pneumatic tires and for other purposes.

The object of the invention is to provide a valve, particularly for pneumatic tires, which is simple in construction and in which the wearing parts are easily removable and can be repaired or replaced quickly by any one at very slight cost. In fact, as will be presently explained, the only part of the valve likely to wear out is composed of a short length of common rubber tubing, which can be replaced in a few moments without the aid of an expert.

In the accompanying drawings, Figure 1 is a vertical section of the valve, showing the same closed and in condition for holding air under pressure. Fig. 2 is a similar view showing the valve open. Fig. 3 is a cross-section on line $x$ $x$, Fig. 1; and Fig. 4 is a view of the inner parts separated.

In the drawings, A indicates the casing of the valve, which is tubular and adapted for attachment to the tire in the ordinary way. The upper part of the casing is threaded internally, and there is a threaded tubular plug or support B, which screws inside the casing A and has a projection on its inner end, upon which there is a short piece of rubber tube C, open at both ends. In the top of the plug is a slot $a$, in which may be fitted a screw-driver $b$ on the screw-cap D. With this screw-driver the plug can be inserted or removed at any time.

At the inner end of the rubber tube is a conical valve E for expanding the end of the tube and compressing it against the wall of the casing to cut off the escape of air. The smaller end of the cone $c$ rests within the inner end of the rubber tube, and the stem $d$ extends up through the plug B and has its top expanded, forming a small head $f$, which prevents the valve from being lost when the plug is removed. The valve E has free play up and down to a limited extent, but it is permanently attached to the plug and removable with it. Below the cone there are projecting points upon the valve, which guide the valve, holding it centrally in the casing, and which serve to draw out the rubber tube if it should stick in the casing.

To inflate the tire, the cap D is removed, the pump-nozzle applied, and the air is blown in, passing through the plug B and the tube C and around the conical valve E into the tire. Small slots $g$ $g$ in the sides of the plug B around the head allow the air to pass under the head. When the pump is stopped, the outflowing air strikes the head of the conical valve and instantly and automatically forces it into the tube, thereby closing the tube and expanding the end of it laterally against the casing. When the tire is inflated, the air is held chiefly by the check-valve, the screw-cap D being screwed on the outer end of the casing to keep out dust and to assist in holding the air from escaping. Fig. 1 shows the screw-cap so attached. Fig. 2 shows it inverted and the screw-driver inserted in the slot of the plug to operate the same.

Having described my invention, what I claim as new, and desire to secure by Letters Patent, is—

1. In an air-valve, the combination of the tubular valve-casing, the tubular plug connected to the inner wall of the casing, the flexible tube supported on the inner end of the plug close to the wall of the casing, and the automatic check-valve, said valve operating to close the inner end of the tube and compress it against the casing when operated by back pressure, substantially as described.

2. In an air-valve, the combination of the tubular internally-threaded valve-casing, the threaded tubular plug removably screwed into said casing and having a projection on its inner end, the inwardly-projecting rubber tube fitting over said projection, and the conical automatic check-valve, said valve operating to close the inner end of the rubber tube and compress it against the casing when operated by back pressure, substantially as described.

3. In an air-valve, the combination with the tubular internally-threaded valve-casing, the threaded tubular plug adapted to be screwed into said casing, the inwardly-projecting rubber tube supported upon said plug, the conical check-valve operating automatically in the inner end of the rubber tube, and the stem upon said valve extending through the opening of the plug and provided with a head upon its outer end, whereby the plug and valve are prevented from separating when the plug is removed, substantially as described.

In witness whereof I have hereunto signed my name in the presence of two subscribing witnesses.

CHARLES H. CLARK.

Witnesses:
R. F. OSGOOD,
A. W. WILBUR.